United States Patent [19]

Satou

[11] Patent Number: 5,113,360
[45] Date of Patent: May 12, 1992

[54] PORTABLE APPARATUS WITH A STRUCTURE TO SECURE A PRINTED CIRCUIT BOARD TO A BASE UNIT

[75] Inventor: Youji Satou, Tokyo, Japan

[73] Assignee: Kabushiki Kaisha Toshiba, Kawasaki, Japan

[21] Appl. No.: 577,550

[22] Filed: Sep. 5, 1990

[30] Foreign Application Priority Data

Oct. 31, 1989 [JP] Japan .................. 1-283723

[51] Int. Cl.⁵ .............................................. G06F 1/00
[52] U.S. Cl. .................................................. 364/708
[58] Field of Search ............... 364/708; 361/395, 398; 174/254; 439/67, 77, 329, 372, 445, 492, 493, 560, 564

[56] References Cited

U.S. PATENT DOCUMENTS

| | | | |
|---|---|---|---|
| 4,490,604 | 12/1984 | Read et al. | 235/146 |
| 4,571,456 | 2/1986 | Paulsen et al. | 379/96 |
| 4,742,478 | 5/1988 | Nigro, Jr. et al. | 364/708 |
| 4,894,792 | 1/1990 | Mitchell et al. | 364/708 |

FOREIGN PATENT DOCUMENTS

| | | | |
|---|---|---|---|
| 0178800 | 4/1986 | European Pat. Off. | 364/708 |
| 62-196900 | 8/1987 | Japan . | |
| 62-193780 | 12/1987 | Japan . | |
| 63-5522 | 1/1988 | Japan . | |
| 63-39985 | 3/1988 | Japan . | |
| 64-70793 | 3/1989 | Japan . | |
| 2-94689 | 4/1990 | Japan | 439/77 |
| 2187334 | 9/1987 | United Kingdom . | |

Primary Examiner—Long T. Nguyen
Attorney, Agent, or Firm—Finnegan, Henderson, Farabow, Garrett, and Dunner

[57] ABSTRACT

A portable computer has a keyboard and a display unit mounted to a base unit. The bottom plate of the base unit includes a front bottom portion and a rear bottom portion angled relative to the front bottom portion. A printed circuit board is mounted on the bottom plate of the base unit. The printed circuit board has a front portion and a rear portion. Holders are respectively attached to the right and left edge portions of the printed circuit board. The holders hold the printed circuit board for locating the front portion on the front bottom portion and the rear portion on the rear bottom portion. The holders and the printed circuit board are secured to the bottom plate of the base unit by screws.

15 Claims, 5 Drawing Sheets

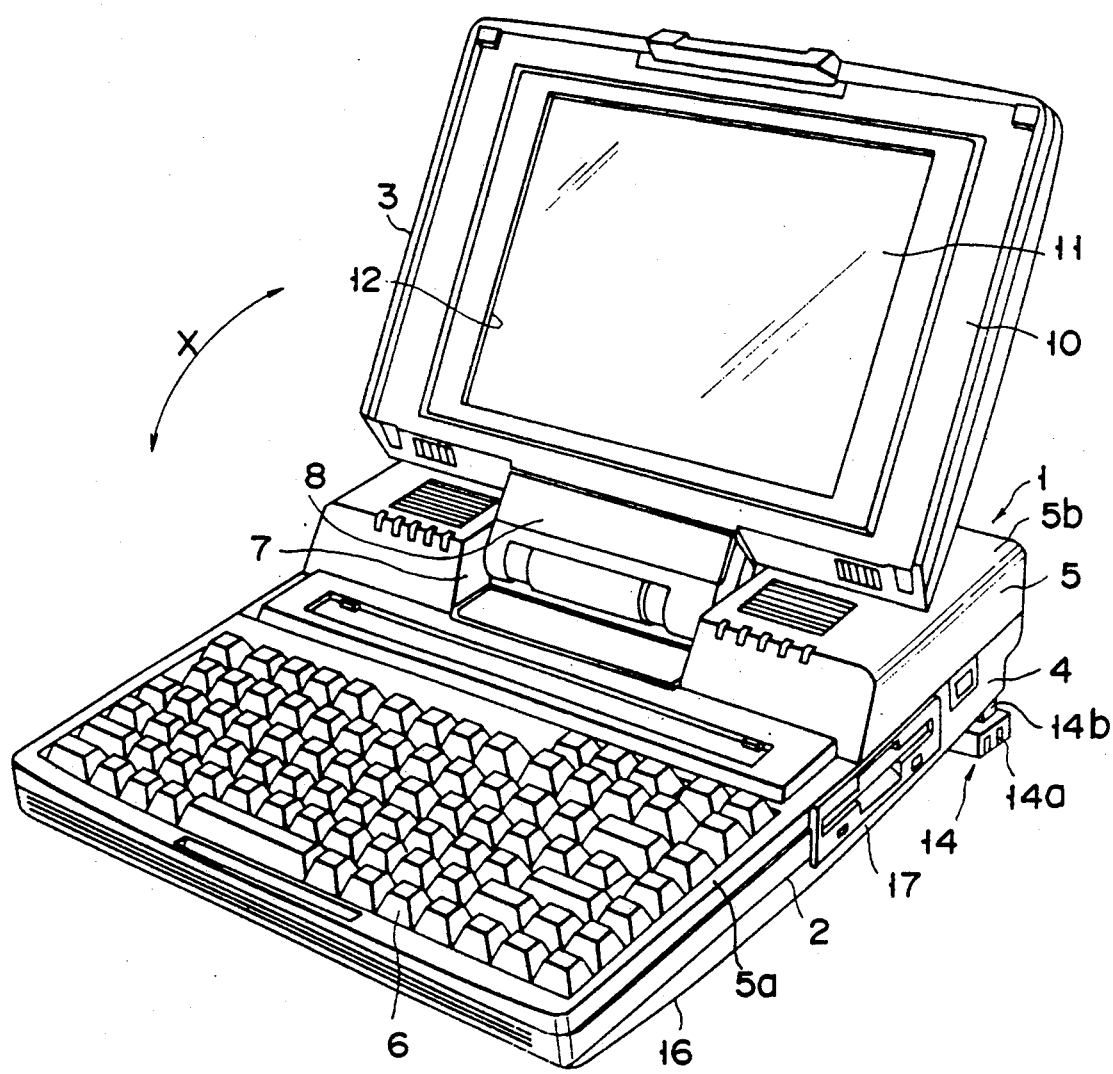
F I G. 1

PORTABLE APPARATUS WITH A STRUCTURE TO SECURE A PRINTED CIRCUIT BOARD TO A BASE UNIT

BACKGROUND OF THE INVENTION

1. Field of the Invention

The present invention relates to a portable apparatus, such as a laptop type or portable type computer. More particularly, this invention relates to a structure of securing a printed circuit board to the base unit of the apparatus.

2. Description of the Related Art

Recently, laptop type computers are popular which have a keyboard and a flat panel type display unit mounted to a base unit having a rectangular box shape.

Of portable computers of this type, the one having a leg also serving as a carrying handle provided at the rear portion of its base unit is disclosed in U.S. Pat. No. 4,571,456. This leg is supported on the base unit in a manner movable between a position where the leg is retained in the base unit and a position where it is pulled out from the rear portion of the base unit. When the base unit is placed on a desk with its leg pulled out therefrom, the entire base unit tilts up, setting its keyboard side (front portion) lower than its leg side (rear portion). As a result, the keyboard tilts toward an operator to facilitate the keyboard operation.

According to such a portable computer, the bottom plate of the base unit is bent upward under the keyboard, in order to improve the stability at the time the base unit is tilted.

Published Unexamined Japanese Patent Application No. 62-196900 and Published Unexamined Japanese Utility Model Application No. 63-39985 disclose a portable computer with a base unit having a bent bottom plate. According to this conventional portable computer, the front portion of the bottom plate of the base unit is inclined toward the keyboard side located thereabove. The inclined portion of the bottom plate comes in contact with the top of a desk when the base unit is tilted up using the leg.

The base unit receives inside a printed circuit board having various circuit parts mounted thereon. The printed circuit board is placed on the bottom plate of the base unit and secured at a plurality of sections to this bottom plate by means of screws. When the bottom plate of the base unit is bent, therefore, the printed circuit board is forcibly bent to match the bent shape of the bottom plate by the tightening force of the screws.

The printed circuit board originally has a flat shape. To secure the flat printed circuit board to the bottom plate of the base unit, first the printed circuit board is pressed against the bottom plate of the base unit. Then the screws should be fastened one by one while setting the printed circuit board in consistent with the bent shape of the bottom plate of the base unit.

The printed circuit board, however, has a size matching the entire shape of the bottom plate of the base unit and has a considerably large rigidity with circuit parts mounted on the printed circuit board. At the time the printed circuit board is pressed against the bottom plate of the base unit, strong repelling force acts on the printed circuit board to force it to return to the original shape, thus inconveniencing the work to secure the printed circuit board to the base unit.

SUMMARY OF THE INVENTION

It is an object of the present invention to provide a portable apparatus with an excellent workability, which permits its printed circuit board to be easily secured to the bent bottom plate of a base unit.

This object is achieved by providing a portable apparatus comprising:

a flat printed circuit board having a front portion and a rear portion;

a base unit for receiving the printed circuit board, which includes a bottom plate having a front bottom portion and a rear bottom portion angled relative to the front bottom portion, the printed circuit board being placed over the front bottom portion and the rear bottom portion;

holding means, attached to the printed circuit board, for holding the printed circuit board for locating the front portion on the front bottom portion and the rear portion on the rear bottom portion; and means for fixing the holding means and the printed circuit board to the bottom plate of the base unit.

With the above arrangement, the printed circuit board is held in a shape matching the shape of the bent bottom plate of the base unit by the holding means before being secured to the base unit. The printed circuit board therefore simply needs to be mounted on the bottom plate of the base unit, thus eliminating the need of a troublesome work to press the printed circuit board against the bottom plate, then bend it.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 1 is a perspective view of a portable computer according to the present invention;

DETAILED DESCRIPTION OF THE PREFERRED EMBODIMENTS

Figure 2:
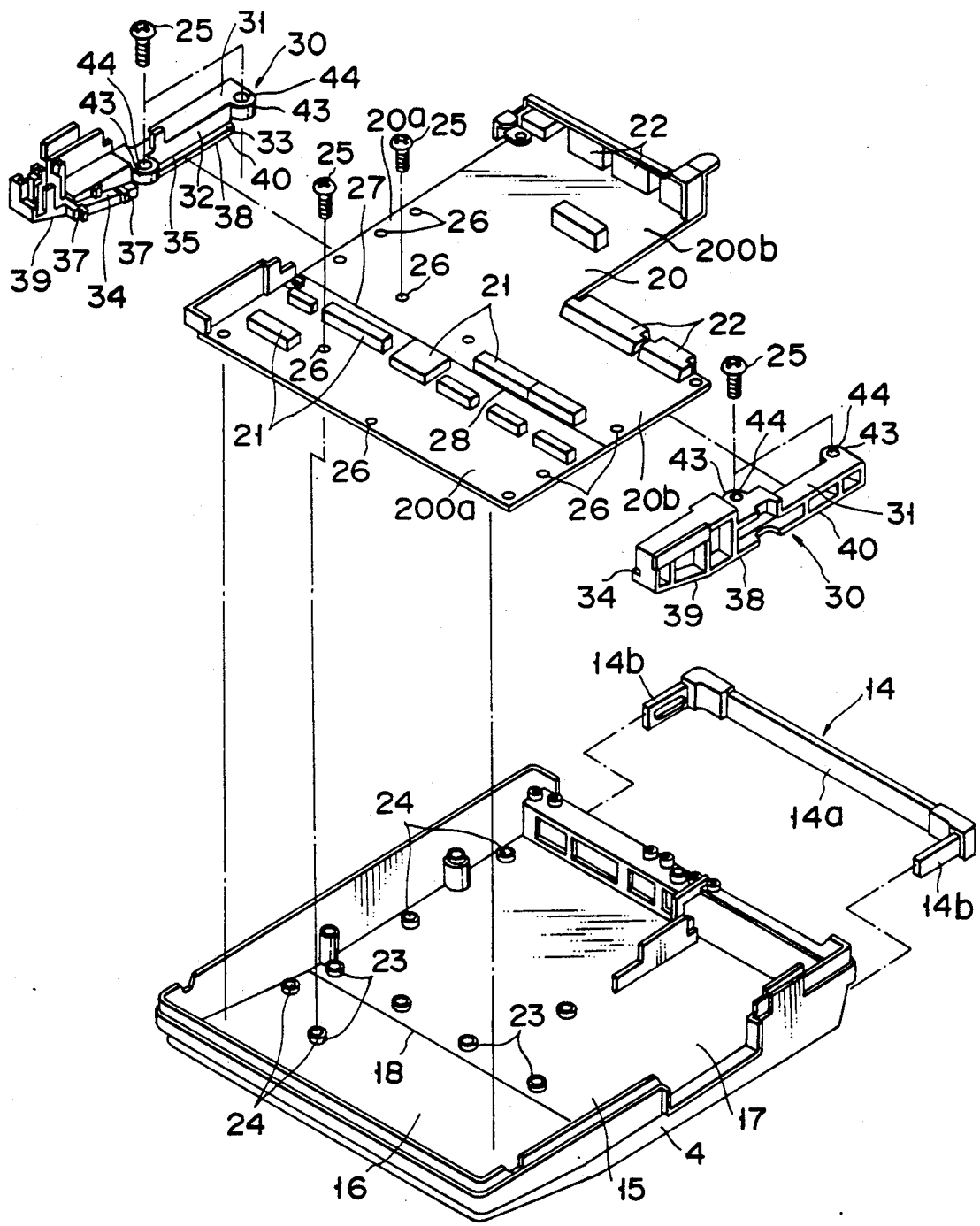
FIG. 2 is an exploded perspective view illustrating a structure of connecting the base unit of the portable computer shown in FIG. 1 and a printed circuit board.

FIG. 1 illustrates a laptop type portable computer 1. The computer 1 has a base unit 2 and a flat panel type display unit 3. The base unit 2, which is shaped like a thin rectangular box, comprises a bottom case 4 with an open top and a top cover 5 that covers the top of the bottom case 4. The top cover 5 has a front portion 5a attached with keyboard 6. A rear portion 5b of the top cover 5 is thicker than the front portion 5a. A support recess 7 is provided at the front center portion of the rear portion 5b of the top cover 5. In this recess 7 is provided a socket 8 to which the display unit 3 is detachably coupled. The socket 8 is mounted rotatable to the top cover 5 by a hinge mechanism (not shown).

The display unit 3 has a housing 10 with a rectangular shape and a flat display located within this housing 10. The display has a plasma display type or liquid crystal type screen 11, which is exposed outside through an opening portion 12 at the front of the housing 10.

The housing 10 of the display unit 3 is connected detachable to the socket 8. This connection permits the display unit 3 to rotate in the direction of the arrow X in FIG. 1 between a closed position where the display unit 3 covers the keyboard 6 and an open position where the keyboard 6 and screen 11 are exposed at the time the keyboard is operated.

At the rear portion of the bottom case 4 is provided a leg portion 14 which serves as a carrying handle. As disclosed in U.S. patent application Ser. No. 07/408,408 filed Sep. 18, 1989 by Takashi Hosoi and Katumaru Sasaki, the leg portion 14 has a handle member 14a extending along the rear portion of the bottom case 4 and a pair of leg pieces 14b each extending from the respective end of the handle member 14a. The leg pieces 14b are supported on the bottom case 4 in such a manner that the leg portion 14 can move between a retained position where the leg portion 14 is retained in the rear portion of the bottom case 4 and a protruding position where it is pulled rearward from the bottom case 4. The leg pieces 14b are designed to be rotatable downward around a guide shaft (not shown) on the side of the bottom case 4 as a pivotal point. With the leg portion 14 in a rotated state, the leg pieces 14b stand upright and the handle member 14a extends below the bottom case 4. When the computer 1 is in use as shown in FIG. 1, therefore, the leg portion 14 is pulled out downward from the rear portion of the bottom case 4 and stands nearly upright, extending below the bottom case 4. The protrusion of the leg portion 14 causes the base unit 2 to tilt up in a direction where the keyboard side is set lower, tilting the keyboard 6 toward an operator.

Figure 3:
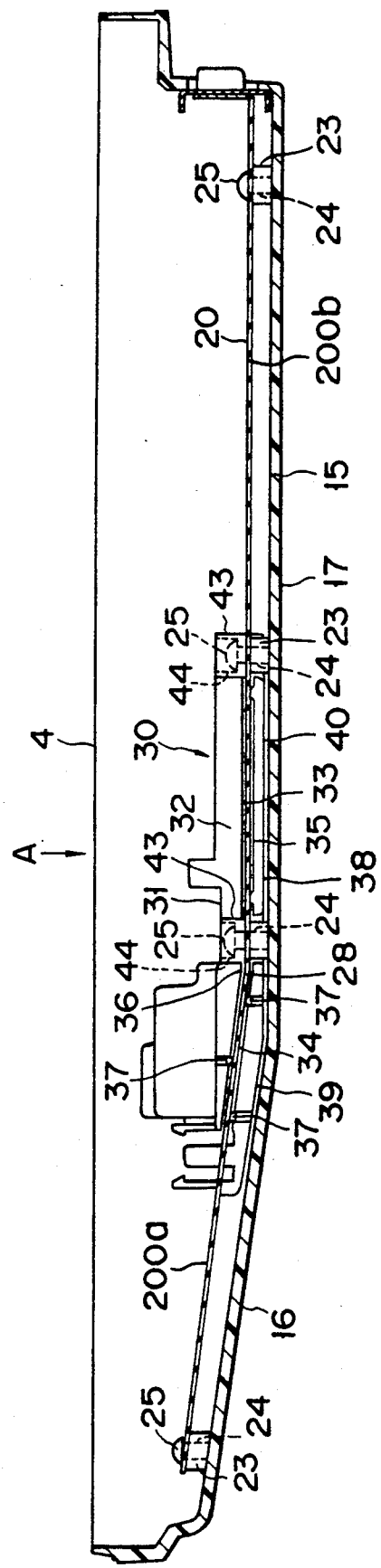
FIG. 3 is a cross sectional view illustrating the printed circuit board being secured to the base unit of the portable computer shown in FIG. 1.
Figure 4:
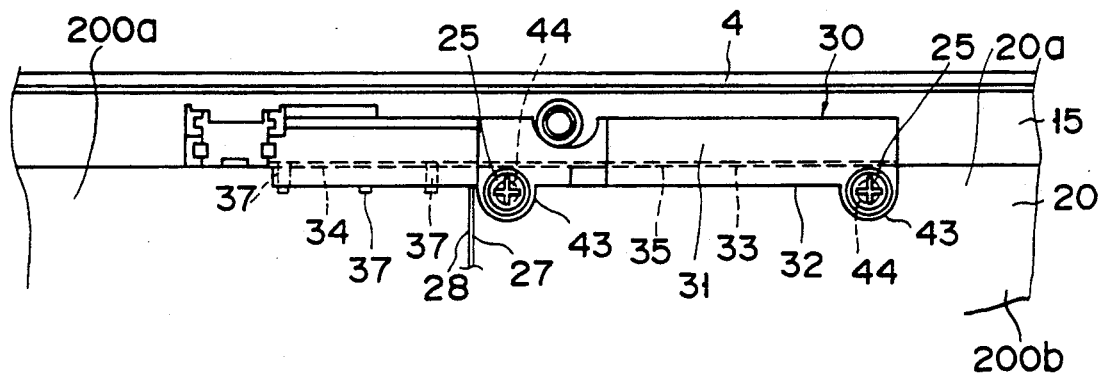
FIG. 4 is a fragmentary view taken in the direction of the arrow A in FIG. 3.
Figure 5:
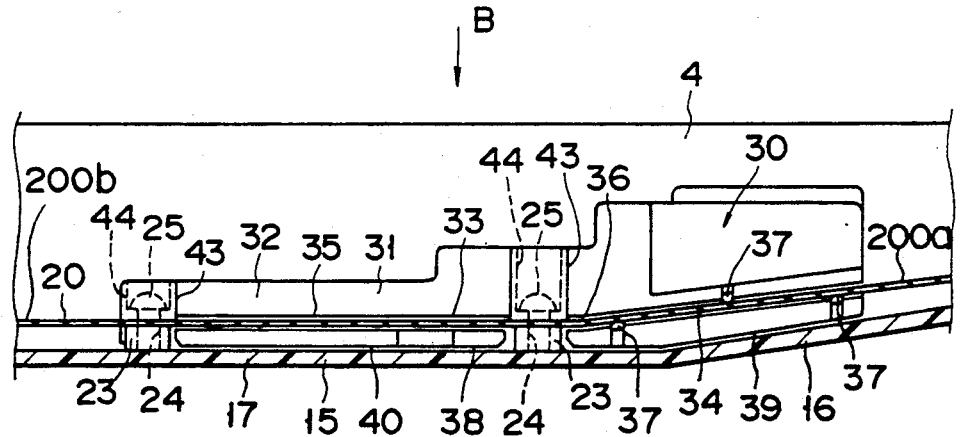
FIG. 5 is a cross sectional view illustrating the printed circuit board being secured to the base unit of the portable computer shown in FIG. 1.
Figure 6:
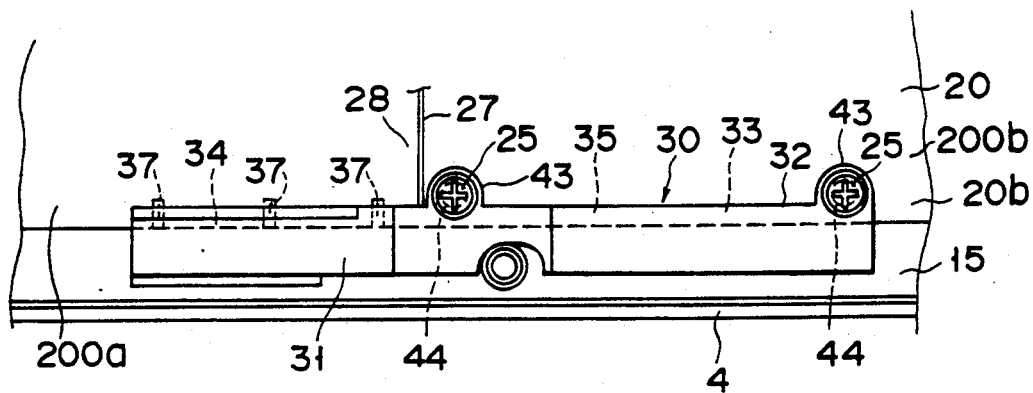
FIG. 6 is a fragmentary view taken in the direction of the arrow B in FIG. 5.

As shown in FIGS. 2 and 3, the bottom case 4 has a bottom plate 15. The bottom plate 15 having front bottom portion 16 inclined upward. The inclined portion 16 of the bottom plate 15 is located below the keyboard 6. The bottom plate 15 has a rear bottom portion 17 extending in the horizontal direction continually from the inclined portion 16. A straight bend line 18 extending in the right-and-left direction of the bottom case 4 is formed at the boundary portion between the inclined portion 16 and horizontal portion 17 of the bottom plate 15. That is, the bottom plate 15 of the bottom case 4 comprises the inclined portion 16 and horizontal portion 17 separated by the bend line 18. The inclined portion 16 of the bottom plate 15 contacts the top of a desk when the base unit 2 is tilted up. This contact increases the area of the base unit 2 contacting the top of the desk and thus improves the stability of the base unit 2 when the computer is in use.

As shown in FIG. 2, a printed circuit board 20 is received in the bottom case 4. The printed circuit board 20 has a rectangular shape in substantially the same size as the bottom plate 15 of the bottom case 4. On the printed circuit board 20 are mounted many electronic parts 21 and connectors 22. The printed circuit board 20 having a front portion 200a and a rear portion 200b. The printed circuit board 20 is secured, placed on the top of the bent bottom plate 15 of the bottom case 4. The structure of the securing the printed circuit board 20 will be described below.

Figures 8, 9:
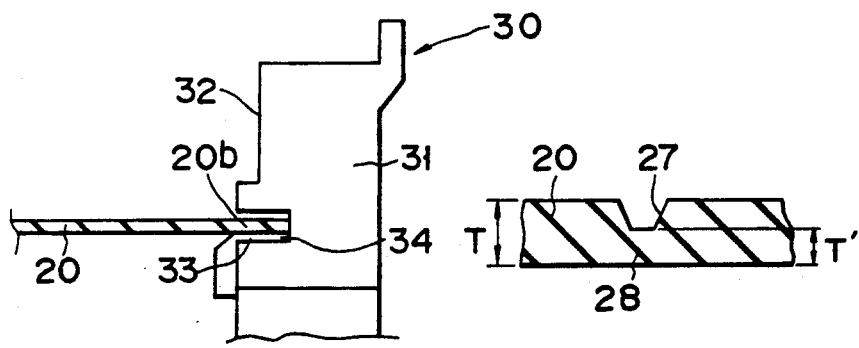
FIG. 8 is a cross sectional view taken along line C—C in FIG. 7.
FIG. 9 is a cross sectional view illustrating in enlargement a bent portion of the printed circuit board shown in FIG. 2.

As shown in FIGS. 2 and 3, a plurality of columnar boss portions 23 for receiving the printed circuit board 20 protrude from the top of the bottom plate 15 of the bottom case 4. Screw holes 24 are formed in the top surfaces of these boss portions 23. A plurality of through holes 26 for receiving securing screws 25 are formed in the printed circuit board 20. These through holes 26 correspond to the screw holes 24 of the boss portions 23. The screws 25 passing the through holes 26 are secured into the screw holes 24, which fastens the printed circuit board 20 to the bottom plate 15 of the bottom case 4. The printed circuit board 20 lies over the inclined portion 16 and horizontal portion 17 of the bottom plate 15. As shown in FIG. 9, the printed circuit board 20 has a to-be-bent portion 28 which is bent at the bend line 18 of the bottom plate 15. A bend groove 27 running along the bend line 18 is formed in the to-be-bent portion 28. At the portion 28, the thickness $T'$ of the printed circuit board 20 is thinner by the depth of the bend groove 27, facilitating the bending of the printed circuit board 20. To right and left side edge portions 20a and 20b of the printed circuit board 20 are attached a pair of holders 30 for locating the front portion 200a on the inclined portion 16 and rear portion 200b on the horizontal portion 17. These holders 30 are located at the to-be-bent portion 28 of the printed circuit board 20. Each holder 30 has a holder body 31 of a synthetic resin; the holder bodies 31 extend along the side edge portions 20a and 20b of the printed circuit board 20, respectively. Each holder body 31 has a side surface 32 facing the printed circuit board 20, and a groove 33 extending from the front to the rear is formed in the side surface 32. The side edge portions 20a and 20b of the printed circuit board 20 are fitted in these grooves 33, respectively. Each groove 33 has a first groove portion 34 and a second groove portion 35. The first groove portion 34 is formed at the front portion of the holder body 31, and extends in parallel to the inclined portion 16 of the bottom plate 15. The second groove portion 35 is formed at the rear portion of the holder body 31, extending in parallel to the horizontal portion 17 of the bottom plate 15. The first and second groove portions 34 and 35 are formed continual from each other. Accordingly, the groove 33 is bent along the bottom plate 15 of the bottom case 4. The bent portion 36 of the groove 33 corresponds to the to-be-bent portion 28 of the printed circuit board 20

Figure 7:
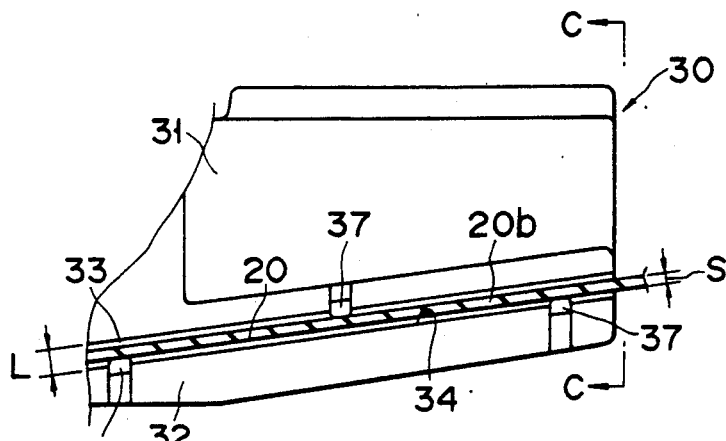
FIG. 7 is a cross sectional view illustrating in enlargement that portion of the securing structure for the printed circuit board shown in FIG. 5 where the printed circuit board is fitted in a groove of a holder.

As shown in FIG. 7, The width L of the groove 33 is set wider than the thickness T of the printed circuit board 20 to facilitate the fitting of the printed circuit board 20. Three projections 37 extending inward are provided one at the top surface of the first groove portion 34 and two at the bottom surface of the first groove portion 34. These projections 37 are separated from one another in the direction of the groove 33. The interval S between the tips of the projections 37 is set equal to the thickness T of the printed circuit board 20. The projections 37 hold the side edge portions 20a and 20b of the printed circuit board 20, so that the holders 30 can hold the printed circuit board 20 to prevent it from coming off. In this holding state, the side edge portions 20a and 20b of the printed circuit board 20 are forcibly bent along the shape of the groove 33. As a result, the printed circuit board 20 is held in a shape bent along the bottom plate 15 of the bottom case 4.

The holder body 31 has a bottom surface 38 facing the bottom plate 15 of the bottom case 4. The bottom surface 38 of the holder body 31 has a front portion 39 corresponding to the inclined portion 16 of the bottom plate 15 and a rear portion 40 corresponding to the horizontal portion 17 of the bottom plate 15. Accordingly, the bottom surface 38 of the holder body 3 is bent along the bent shape of the bottom plate 15.

A pair of boss portions 43, which lie over the top of the printed circuit board 20, are formed at the side surface 32 of the holder body 31, one at the front portion thereof and the other at the rear portion. These boss portions 43 match the respective boss portions 23 of the bottom case 4 and hold, together with the boss portions 23, the printed circuit board 20. The boss portions 43 each have a through hole 44 in which the associated screw 25 is to be fitted. The through holes 44 match the through holes 26 of the printed circuit board 20 and the screw holes 24 of the boss portions 23. Therefore, the screws 25 are screwed in the screw holes 24 of the bottom case 4 through the holder bodies 31 and the printed circuit board 20, thus fastening the printed circuit board 20 together with the holders 30 to the bottom plate 15 of the bottom case 4.

A description will now be given of the procedures of securing the printed circuit board 20 to the bottom plate 15 of the bottom case 4.

First, the side edge portions 20a and 20b of the printed circuit board 20 are fitted in the grooves 33 of the holder bodies 31. This fitting job is done with the bent portions 36 of the grooves 33 matching the to-be-bent portion 28 of the printed circuit board 20. Since the grooves 33 are bent along the bent shape of the bottom plate 15 of the bottom case 4, the side edge portions 20a and 20b of the printed circuit board 20 are guided into the grooves 33 and forcibly bent at the bend groove 27. As a result, the entire printed circuit board 20 is held in a bent shape along the bottom plate 15 of the bottom case 4.

Next, the printed circuit board 20 is placed on the bottom plate 15 of the bottom case 4. At this time, the printed circuit board 20 is bent in advance along the bent shape of the bottom plate 15 by the holders 30, the front portion 200a and rear portion 200b of the printed circuit board 20 contacts the tops of the boss portions 23 on the bottom plate 15. In this state, the through holes 26 of the printed circuit board 20 and the through holes 44 of the holder bodies 31 are rendered to match the screw holes 24 of the boss portions 23. Then, the screws 25 are sequentially fitted in the through holes 26 and 44, and screwed into the screw holes 24. This tightening permits the printed circuit board 20 together with the holders 30 to be fastened to the bottom plate 15 of the bottom case 4.

Since the printed circuit board 20 is held in a bent shape along the bottom plate 15 of the bottom case 4 by means of the holders 30, as described above, a simple work to place the printed circuit board 20 on the bottom plate 15 can cause the printed circuit board 20 to lie over the boss portions 23 on the bottom plate 15. This can eliminate a troublesome work of fastening the screws 25 while pressing the printed circuit board 20 against the bottom plate 15, thus facilitating the attachment of the printed circuit board 20.

Further, since most repelling force to return the printed circuit board 20 to the original flat shape is received by the holders 30, concentrated repelling force of the printed circuit board 20 is not applied to the bottom plate 15 of the bottom case 4. This reduces the load burden of the bottom case 4 and can prevent the bottom case 4 from being deformed or strained.

The portable apparatus according to the present invention should not necessarily be restricted to a laptop type portable computer, but the present invention may also be applied to a word processor or a liquid crystal television.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A portable apparatus comprising:
   a flat printed circuit board having a front portion and a rear portion;
   a base unit for receiving said printed circuit board, including a bottom plate having a shape defined by a front bottom portion and a rear bottom portion angled relative to said front bottom portion, said printed circuit board being placed over said front bottom portion and said rear bottom portion;
   holding means attached to said printed circuit board, said holding means including means for bending said printed circuit board into a shape such that the front portion is angled relative to the rear portion, for holding said printed circuit board in the shape corresponding to the shape of said angled bottom plate, said holding means further including means for locating the front portion of said circuit board on the front bottom portion of said bottom plate, and the rear portion of said circuit board on the rear bottom portion of said bottom plate; and
   fixing means for fixing said holding means and said printed circuit board to said bottom plate of said base unit.

2. The portable apparatus according to claim 1, wherein said fixing means includes a fastener penetrating said printed circuit board and said holding means and fastened into said bottom plate of said base unit.

3. The portable apparatus according to claim 1, wherein said holding means has a body extending along a side edge portion of said printed circuit board, and a groove for receiving said side edge portion of said printed circuit board is formed in said body and has a first groove portion extending in parallel to said front bottom portion of said bottom plate and a second groove portion extending in parallel to said rear bottom portion of said bottom plate, said first groove portion being angled relative to said second groove portion.

4. The portable apparatus according to claim 3, wherein said body of said holding means includes a bottom surface having a front bottom surface corresponding to said front bottom portion of said bottom plate and a rear bottom surface corresponding to said rear bottom portion of said bottom plate.

5. The portable apparatus according to claim 3, wherein said body of said holding means includes boss portion for holding said printed circuit board between said bottom plate of said base unit and said boss portion.

6. The portable apparatus according to claim 3, wherein said groove of said body has a width set greater than the thickness of said printed circuit board.

7. The portable apparatus according to claim 3, wherein said groove of said body includes a plurality of projections protruding from the mutually-facing inner walls thereof, tips of said projections abut on said printed circuit board to hold said printed circuit board by inner sides of said groove.

8. The portable apparatus according to claim 1, wherein said printed circuit board has a size substantially equal to that of said bottom plate of said base unit and has circuit parts mounted thereon.

9. The portable apparatus according to claim 1, wherein said printed circuit board has a bend groove for inclining said front portion relative to said rear portion.

10. The portable apparatus according to claim 1, wherein said base unit has a keyboard and a display unit mounted thereon, said keyboard located at a front portion of said base unit and said display unit located at a rear portion of said base unit.

11. The portable apparatus according to claim 10, wherein said display unit is rotatable between a closing position for covering said keyboard and an open position for exposing said keyboard.

12. The portable apparatus according to claim 10, wherein said base unit has a leg section for tilting up said base unit.

13. The portable apparatus according to claim 10, wherein said base unit has a bottom case including said bottom plate and a top cover for covering said bottom case, said keyboard being attached to a top front portion of said top cover and said display unit being attached to a top rear portion of said top cover.

14. A method of assembling a portable apparatus comprising a flat printed circuit board, a base unit for receiving said printed circuit board having mutually-facing side edge portions, which includes a bottom plate bent upward and having an inclined portion, a horizontal portion and a bent portion therebetween, said printed circuit board being placed over said inclined portion and horizontal portion on said bottom plate, said method comprising the steps of:

attaching holding members to the mutually-facing side edge portions of said printed circuit board, said holding members for bending and holding said printed circuit board in a shape matching a bent shape of said bottom plate of said base unit;

placing said bent printed circuit board together with said holding members on said bottom plate of said base unit; and securing said printed circuit board and said holding members to said bottom plate of said base unit.

15. A portable apparatus comprising:

a printed circuit board having a front portion and a rear portion intersecting at a bendable portion;

a base unit for receiving said printed circuit board, said base unit including a bottom plate having a front bottom portion and a rear bottom portion angled relative to said front bottom portion, said printed circuit board being placed over said front bottom portion and said rear bottom portion;

holding means attached to said printed circuit board for holding said printed circuit board, said holding means including means for bending said printed circuit board at said bendable portion to correspond to said bottom plate, with said rear portion of said printed circuit board angled relative to said front portion; and fixing means for fixing said holding means and said printed circuit board to said bottom plate of said base unit.

* * * * *